United States Patent [19]

Gay et al.

[11] Patent Number: 4,796,295
[45] Date of Patent: Jan. 3, 1989

[54] TELEPHONE CIRCUITS

[75] Inventors: Michael J. Gay; Johannes A. Gutmann, both of Vaud, Switzerland

[73] Assignee: Motorola, Inc., Schaumburg, Ill.

[21] Appl. No.: 911,833

[22] Filed: Sep. 26, 1986

[30] Foreign Application Priority Data

Oct. 7, 1985 [GB] United Kingdom ............ 8524692

[51] Int. Cl.$^4$ .................................... H04M 1/58
[52] U.S. Cl. ............................. 379/392; 379/395; 379/398
[58] Field of Search ............. 379/387, 388, 389, 390, 379/391, 392, 394, 395, 396, 397, 398, 399, 402, 405, 416, 417, 419, 420, 421, 345

[56] References Cited

U.S. PATENT DOCUMENTS

| 3,529,099 | 9/1970 | Ribner | 379/392 X |
| 4,358,644 | 11/1982 | Hubler | 379/392 X |
| 4,515,996 | 5/1985 | Burgin | 379/395 X |
| 4,536,616 | 8/1985 | Kaire | 379/392 |

FOREIGN PATENT DOCUMENTS 0035661 2/1986 Japan ............................ 379/395

OTHER PUBLICATIONS

"A Programmable Speech Circuit Suitable for Telephone Transducers", P. Consiglio et al., *IEEE Journal of Solid-State Circuits*, vol. SC-17, No. 6, Dec. 1982, pp. 1149–1157.

"Phone IC Banishes Carbon Mike, Takes on Hybrid Coil's Functions", S. D'Arrigo et al., *Electronics*, Jun. 16, 1982, pp. 153–155.

*Primary Examiner*—Jin F. Ng
*Assistant Examiner*—Randall S. Vaas
*Attorney, Agent, or Firm*—Michael D. Bingham

[57] ABSTRACT

A circuit is disclosed for use in telephone handsets having a line signal node (1), a microphone signal input (20) and an output to an earphone amplifier. There is provided two voltage feedback loops via respective impedance networks (10, 11) and a current feedback loop (5, 7, 14). These feedback loops determine the impedance presented to the line at the signal node with specific voltage/current characteristics and signal frequencies. The first voltage feedback loop in conjunction with the current feedback loop defines the signal frequency impedance and the second voltage feedback loop defines the DC mask presented to the line.

11 Claims, 2 Drawing Sheets

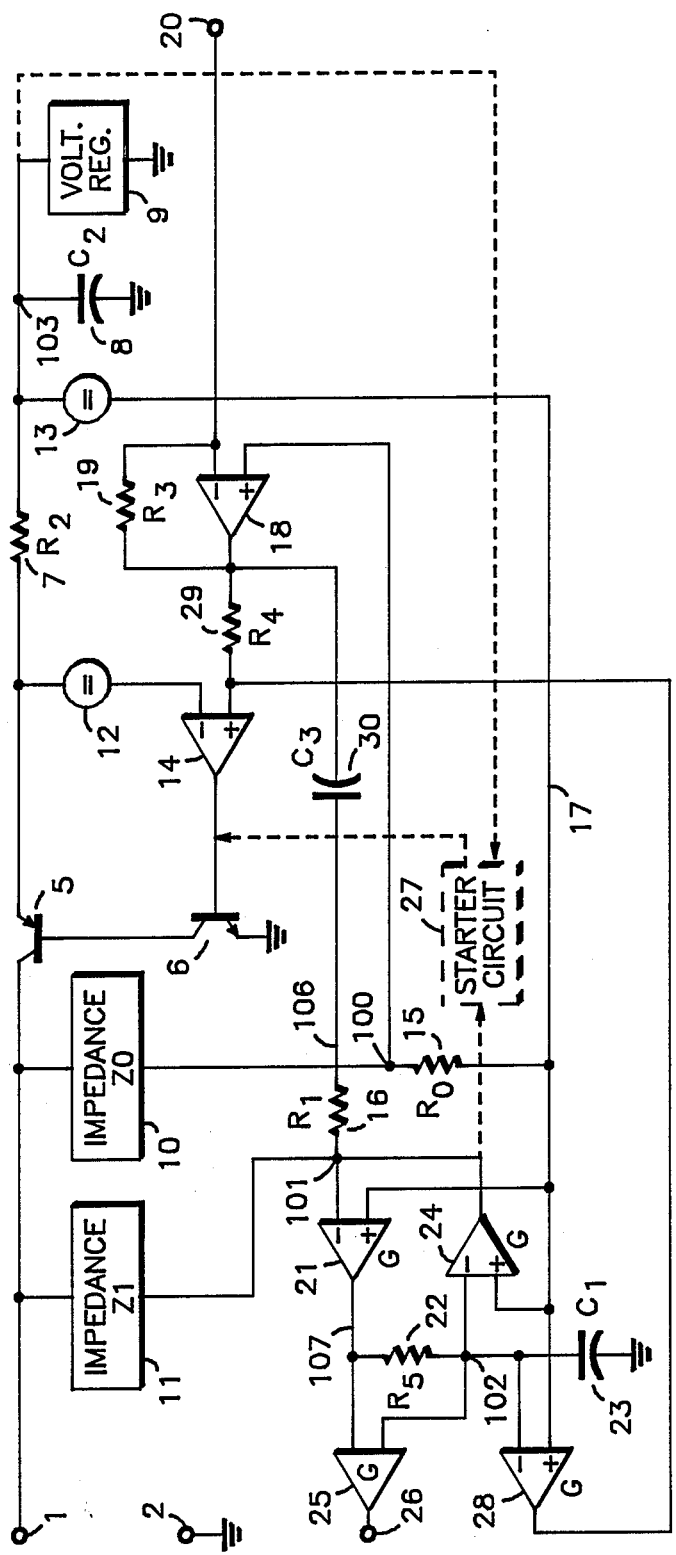
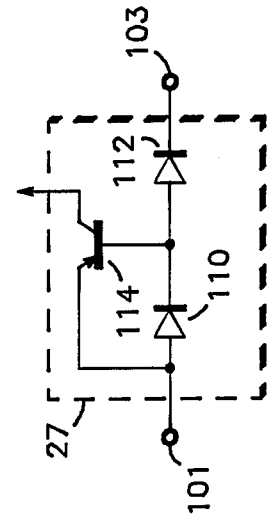
FIG. 1
FIG. 4

TELEPHONE CIRCUITS

This invention relates to telephone circuits and more particularly to circuits for use in telephone handsets.

The complexity of integrated circuits has reached such a level that integration of complete high performance telephone circuits is possible, provided that high density low voltage technologies can be used. The invention concerns circuit configurations which comply with this need while responding to other characteristic constraints of telephone speech circuit applications. It should be understood that the large areas of digital circuitry required for dialling functions themselves pose no low voltage operation problems: the difficulties are specific to the analogue circuitry which interfaces with the telephone line.

Thus the present invention seeks to provide an improved telephone circuit which in a preferred form may be implemented substantially in low voltage technology and with a minimum of high voltage components. Accordingly, the invention provides a telephone circuit for use in a telephone handset and comprising a signal node for receiving a signal voltage;
a microphone signal input;
an earphone amplifier having an input and an output;
a first impedance coupled between the signal node and the input of the earphone amplifier;
means for combining a microphone signal fed to the microphone signal input with a voltage derived from the signal node via a second impedance to provide a combined output signal at its output, the output of said combining means being coupled to the input of said earphone amplifier; and
means for comparing the combined output signal with a voltage representative of current flowing at the signal node, an output voltage provided by the comparing means being used to control the current flowing at the signal node, and the combined output signal being in antiphase with the signal voltage at the signal node so as to tend to cancel the microphone signal at the input of the earphone amplifier.

Preferably, the combining means comprises an operational amplifier having a first input coupled to said second impedance and a second input coupled to said microphone signal input, and the comparing means may conveniently comprise a further operational amplifier having a first input coupled to said output of said combining means and a second input coupled to said signal node via a voltage regulator which provides said voltage representative of current flowing at the signal node.

It will be appreciated however that both the combining means and the comparing means may, if desired be formed of any suitable circuit means that provide the desired function. For example, they may be composed of suitable resistor networks coupled with other conventional amplifying means.

The current flowing at the signal node is conveniently controlled by means of a negative feedback loop whereby said output voltage provided by said comparing means is coupled to the control electrode of a first high voltage transistor whose emitter is coupled to a ground reference potential and whose collector is coupled to the control electrode of a second high voltage transistor whose emitter is coupled to the signal node and whose collector is coupled via a voltage regulator back to said comparing means.

In a preferred embodiment, the earphone amplifier comprises a variable gain means coupled to the first input of said earphone amplifier and being responsive to a first control signal for controlling the gain, the output of said variable gain means providing an input signal to subsequent amplifying stages of the earphone amplifier.

The earphone amplifier preferably also comprises a second input coupled via a third impedance to said signal node and to the output of said combing means, and a second variable gain means coupled to said second input of said earphone amplifier and being responsive to a second control signal for controlling the gain, the output of said second variable gain means being coupled to the output of the first-mentioned variable gain means and providing therewith an input signal to subsequent amplifying stages of the earphone amplifier.

Desirably, the first impedance provides a DC path between said signal node and the first-mentioned input of said earphone amplifier, and said earphone amplifier provides a DC output representative of the DC flow through said first impedance and having a known relationship with the quiescent voltage established at the signal node and hence with the length of a line coupled to the signal node. The third impedance preferably also provides a DC path between said signal node and said second input of said earphone amplifier and said earphone amplifier provides a DC output representative of the DC flows through both the first and third impedances.

The DC output is preferably coupled to said first input of said comparing means so as to produce a desired relationship between the DC current absorbed at said signal node and the quiescent voltage obtained thereat. It may alternatively or additionally be used to control the gains of variable gain means provided in the paths of the microphone signal applied to the microphone signal input and of the earphone signal produced at the earphone amplifier output in such manner that the performance of a telephone system incorporating said telephone circuit may be compensated for variations in transmission lossed resulting from variations in the telephone line length. It may also be used to provide said first and second control signals, whereby the output of said earphone amplifer is dependent on the signal appearing at the first or second inputs of the earphone amplifier or on a weighted combination thereof so that the hybrid balance impedance presented by the circuit to the telephone line may be varied so as to compensate for variations in the telephone line length.

The invention will first be described in terms of a first preferred embodiment responding to a particular group of telephone specifications. Ways of adapting the invention to respond to other sets of specifications resulting in other embodiments will also be shown.

The first preferred embodiment is an arrangement applicable in those cases in which the maximum quiescent current drawn from the telephone line during normal use (conversation mode) should be limited. Other embodiments are applicable where the telephone line voltage may fall to very low values, but the maximum current need not be limited by the circuit. The invention will be described with reference to the drawings, of which:

FIG. 1 is a block diagram of a first embodiment in a simplified form of a circuit for use in a telephone handset according to the invention;

FIG. 4 is a schematic diagram illustrating a start up circuit of the embodiment of FIG. 1.

Figure 2:
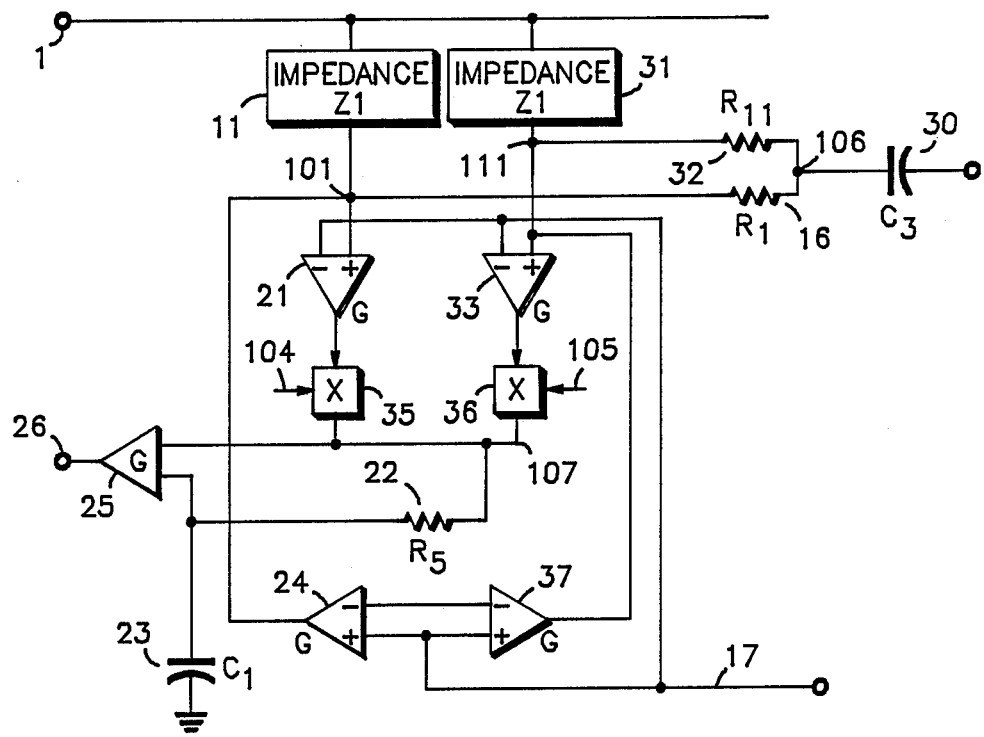
FIG. 2 is a block diagram of part of the circuit of FIG. 1 incorporating some additional features.

Referring first to FIG. 1, it is to be understood that a telephone line is conventionally connected via a diode bridge, protection circuitry and hook switch to a telephone circuit according to the invention via input terminals 1 and 2, the latter being taken as the ground reference. Input terminal 1 is coupled to the emitter of a high voltage transistor 5 having its base coupled to the collector of a second high voltage transistor 6 and it collector coupled via a current sense resistor 7 to a reservoir capacitor 8 and to shunt regulator means 9 via supply line 103. Input terminal 1 is also coupled to the first terminals of two reference impedance networks 10 and 11. The collector of transistor 5 is also coupled via first offset voltage generator means 12 to the inverting input of an operational amplifier 14, the output of which feeds the base of transistor 6. The emitter of transistor 6 is returned to the ground reference. The second terminal of reference impedance network 10 is coupled to node 100 and thence via a resistor 15 to a reference voltage level on line 17, said level being derived from the regulated supply line 103 via second offset generator means 13 which is conveniently adjusted to provide the same offset as generator 12. The second terminal of network 11 is coupled to a node 101 and thence via a resistor 16 to a node 106 which is coupled, preferably via capacitor means 30, to the output of a second operational amplifier 18 which has its non-inverting input coupled to node 100 and its output coupled also to the non-inverting input of amplifier 14 via a resistor 19. Amplifier 18 is provided with shunt voltage negative feedback via a resistor 19, and is adapted to receive, at its inverting input, an input signal originating from a microphone in the form of a current drive at terminal 20.

Elements 21, 24, 25 are transconductance amplifiers designed to provide defined output currents in response to differential voltages applied between high impedance input terminals and which form the first stages of an earphone amplifier.

The transconductance amplifier 21 has its non-inverting input coupled to node 101 and its output coupled to node 107 and via a resistor 22 to node 102 to which are coupled the first terminal of a capacitor 23 having its second terminal returned to a ground reference, the inverting input of transconductance amplifier 24, and the inverting input of a further transconductance amplifier 28, having particular characteristics which are discussed later. The inverting input of amplifier 21 and the non-inverting inputs of amplifiers 24 and 28 are connected to the reference voltage line, 17. The transconductance amplifier 25 is coupled to receive in arbitrary sense an input signal developed across resistor 22 and to provide an output at terminal 26 adapted to feed further stages of the earphone amplifier. The output terminal of amplifier 24 is returned to node 101 and that of amplifier 28 to the non-inverting input of amplifier 14. In order to start up the circuit, means 27 are provided (shown in dotted outline), having inputs couple to node 101 and to the reservoir capacitor via the supply line 103 and an output coupled to the base of transistor 6. These means 27 are so designed as to be rendered non-conducting during normal operation of the circuit. One example of such means is illustrated in FIG. 4 may include two diodes connected in series with the anode of one diode being coupled to node 101 and the cathode of the second diode being coupled to supply line 103. A pnp transistor is then connected with its base coupled to the junction between the two diodes, its collector coupled to the base of transistor 6 and its emitter coupled to node 101.

The principles of operation will now be described. When the telephone hook switch closes, current is supplied via network 11, which must provide a d.c. path, and starting means 27 to the base of transistor 6. Transistor 5 is thereby brought into conduction absorbing the current available from the telephone line and feeding it via resistor 7, to the reservoir capacitor 8, thus providing power to the circuitry. Once the voltage established on the capacitor 8 suffices, the starting means are rendered inoperative and the circuit functions thereafter in its normal mode as follows.

The networks 10, 11 are designed to have very high impedance so that all of the current supplied by the telephone line flows in transistor 5 in response to the action of the circuit's feedback loops. The DC component flowing in the collector circuit of said transistor charges the reservoir capacitor 8, to a voltage limited by the shunt regulator means 9. The power supply for the circuit is thus established.

The circuit contains voltage feedback loops via networks 10, 11 and a current feedback loop controlled by the current flowing through the resistor 7 in the collector circuit of transistor 5. These loops determine the impedance presented to the telephone line at signal frequencies and the quiescent voltage/current characteristic presented thereto; normally referred to as the DC mask.

The signal frequency impedance is defined by the loop via network 10 and the current feedback loop. Signals appearing at node 1 produce an image at node 100 to which the non-inverting input of amplifier 18 is coupled. Since the inverting input of said amplifier is fed from a high impedance source any signal applied to the non-inverting input is transferred with unity gain to the output. Since the amplifier 28 has high output impedance the signals produced at the output of amplifier 18 will be applied unattenuated at the non-inverting input of amplifier 14. By operation of the feedback loop comprising elements 14, 6, 5, 7, 8, 12 such signals will be counterbalanced by equal signals applied to the inverting input of 14 and produced in response to the current flow in transistor 5 passing through resistor 7. Said current flow is substantially equal to the line current so the signal frequency input impedance $Z_{IN}$ may be seen to be given by $$Z_{IN} = \frac{Z_0 R_2}{R_0}$$

Where
  $Z_0$ is the impedance of network 10,
  $R_0$ is the resistance of resistor 15, and
  $R_2$ is the resistance of resistor 7.

In addition to the loop via network 10 the circuit contains a loop via network 11 which serves, in conjunction with the former, or separately, to define the DC mask. From FIG. 1 it will be seen that the circuit presents a very low DC resistance at node 101 due to the presence of the negative feedback loop formed by elements 21, 22, 23, 24. The quiescent voltage at node 101 will thus be equal to the reference voltage on line 17 and the quiescent current flowing through network 11 will be absorbed by the transconductance amplifier 24. The input voltage required by amplifier 24 to cause it to absorb said quiescent current is applied also to the input of the transconductance amplifier 28 which thus provides an output current related to said quiescent current by the ratio of the transconductances of amplifiers 24 and 28. The output current of amplifier 28 flows through resistor 29 into the low resistance presented at the output of the shunt feedback stage 18, 19, developing in consequence a voltage applied to the non-inverting input of amplifier 14. By the action of the feedback loop comprising elements 14, 6, 5, 7, 8, 12 this voltage will be counterbalanced by an equal voltage developed across resistor 7 in response to a current in transistor 5, said current being drawn from the telephone line. It may hence be understood that an incremental change in the quiescent line voltage $\Delta V$, will produce by the mechanism described, an incremental change in the quiescent line current $\Delta I$, given by:

$$\Delta I = \frac{\Delta V}{(Z_1)_0} \frac{G_{28}}{G_{24}} \frac{R_4}{R_2}$$

where
 $(Z_1)_0$ is the DC resistance of network 11,
 $R_4$ is the resistance of resistor 29, and
 $G_{24}$, $G_{28}$ are the transconductances of amplifiers 24, 28 respectively.

The DC mask of the circuit is defined by the action of the feedback loop described above and, if network 10 provides a DC path, by the action of the first described loop which defines the circuit's input impedance at signal frequencies.

The DC mask is often required to be non-linear, presenting a low incremental resistance at low element levels and a high incremental resistance at high current levels. This can be achieved by making amplifier 28 non-linear. In some cases the incremental conductance produced by the operation of the loop via network 10 corresponds to that needed at high current levels. Amplifier 28 can then be designed to have a simple limiter characteristic so that the loop via network 11 increases the conductance at low current levels but is inactive at high current levels. It will be realised that many forms of DC mask may be tailored by appropriate design of amplifier 28. In particular the phasing of the gain of this amplifier may be made to change as a function of the input signal if required.

It will be noted that the loop via network 11 is decoupled by capacitor 23 and does not significantly influence the impedance presented to the telephone line at signal frequencies provided that said capacitor be correctly valued.

Microphone signals, applied as a current drive at node 20 produce a voltage drive at the output of amplifier 18 which is applied un-attenuated at the non-inverting input of amplifier 14. From the foregoing descriptions of the circuit operation it will be understood that a current flow will thus be induced in the telephone line and that this current, were the line impedance zero, would be given by:

$$I_M \frac{R_3}{R_2}$$

where
 $I_M$ is the imposed current at node 20, and
 $R_3$ is the resistance of resistor 19.

The voltage developed at the terminals 1, 2 is of course given by this current flowing in the parallel combination of the line impedance and the circuit's input impedance.

Earphone signals, originating from the telephone line and applied as a voltage at node 1 produce an image at node 101 comprised of a component coupled via network 11, superimposed with a component coupled via network 10, amplifier 18 and the resistor, capacitor network 16, 30. The signal at node 101 is amplified by amplifier 21 feeding resistor 22 and again by amplifier 25 feeding a current to subsequent stages. Assuming capacitor 30 to be large it will be seen that the ratio of the signal at nodes 101 and 1 is:

$$\frac{R_1}{R_1 + Z_1} + \frac{R_0}{R_0 + Z_0}$$

where
 $R_1$ is the resistance of resistor 16, and
 $Z_1$ is the impedance of network 11.

It will be understood that the signal level produced at node 1 in response to an excitation on the telephone line is determined by the level of excitation, the line impedance, and the circuit's input impedance.

A key requirement for telephone systems is that signals originating from the microphone should not produce substantial outputs at the earphone. The natural transmission path from the microphone to the line to the earphone must therefore be balanced by another path adapted to feed an equal but oppositely phased signal to the earphone. The characteristics of both paths need to be well controlled for effective cancellation to result. It is a feature of this invention that the performance depends only on the tolerances of passive components and that a minimum of networks are required.

It will be understood, from the foregoing descriptions of the circuit's operation, that excitation from the microphone will induce a signal at the output of amplifier 18, which will be matched by a signal developed across resistor 7 by a signal current drawn from the line via transistor 5. The signal voltage developed across the terminals 1, 2 will be determined by said signal current flowing in the signal frequency impedance presented by the line. Thus if the microphone induced output signal from amplifier 18 if $V_M$, and the line impedance is $Z_L$, then the microphone induced signal accross the line will be $$-V_M \frac{Z_L}{R_2}$$

the negative sign indicating inversion with terminal 1 considered as the positive output.

The signal applied to the earphone is derived from that at node 101. It will be seen that this signal is defined by the potential divider formed by the elements 11, 16, 30 connected between node 1 and the output of amplifer 18, the feedback loop 21, 22, 23, 23 being inactive at signal frequencies. Noting that the signal at amplifier 18 output is $V_M$ while that at node 1 is $$-\frac{V_M Z_L}{R_2}$$

it is clear that the corresponding signal at node 101, assuming always that the value of capacitor 30 is large, will be $$\frac{Z_1}{Z_1+R_1} \cdot V_M - \frac{R_1}{Z_1+R_1} \cdot V_M \frac{Z_L}{R_2} = \frac{V_M}{Z_1+R_1}\left(Z_1 - \frac{R_1 Z_L}{R_2}\right)$$

The signal will be zero, that is, in the usual terminology, hybrid balance will obtain, when $$Z_1 = \frac{R_1 Z_L}{R_2}$$

The hybrid balance impedance $Z_H$, defined as the impedance the line must present to permit ideal balance, is of course:

$$Z_H = \frac{R_2}{R_1} Z_1$$

which is thus defined by the network 11 and a resistor ratio. The elements concerned can all be external to the integrated circuit and thus be precise and adapted to particular conditions.

Telephone handset circuits are usually required to contain means for adapting the gains in the microphone and earphone signal paths as a function of the telephone line length, so as to compensate for variations in the transmission losses. For DC, the line appears as a voltage source in series with a resistance which is a function of the line length. The current absorbed by the handset circuit and the voltage established accross its terminals are determined by said resistance and the DC mask. It is therefore feasible to obtain a control signal related to said resistance and hence to the line length. As an example, in the circuit of FIG. 1 the current supplied by amplifier 24 is strongly related to the line length so a similar amplifier having its inputs common with those of amplifier 24 can provide a suitable control signal. It is well known that such a control signal may be used to adjust variable gain means in the microphone and earphone paths of handset circuits, so as to provide the desired compensation for transmission loss variations. It is desirable, also, that the hybrid balance impedance be adjusted as a function of line length since the impedance presented by the line, at signal frequencies, varies with length. Thus, it is desirable that the hybrid balance impedance be variable between two limit conditions, in a continuous manner, as a function of a control signal related to the line length. FIG. 2 shows how the circuit of FIG. 1 may be modified to permit this. For simplicity only that part of the circuit which is modified is shown; sections not shown are unchanged.

In FIG. 2 an additional network 31 is coupled from terminal 1 to a node 111 and thence via a resistor 32 to node 106. A transconductance amplifier 33, similar to amplifier 21 has its non-inverting input connected to node 111 and its inverting input connected to the reference voltage line 17. The output of amplifier 33 is coupled to an input of variable multiplier means 36 having an input terminal, output terminal and control terminal for adjusting the multiplication factor in response to a control signal, and being adapted to receive the output from amplifier 33 at its input terminal and to provide a current drive at its output terminal. Multiplier 36 receives a control signal at node 105. Amplifier 21 has its output terminal coupled to second variable multiplier means 35 similar to 36 and receiving a control signal at node 104. The outputs of multipliers 35 and 36 are coupled together at node 107. A transconductance amplifier 37 similar to amplifier 24 is connected to receive the same input signal as amplifier 24 and has an output coupled to node 111.

It will be clear to those skilled in the art that, if the gain of multiplier 35 is set to unity, while that of multiplier 36 is set to zero, then the circuit is equivalent to that of FIG. 1 at signal frequencies, signals coupled via network 31 being unused. Likewise if the gain of multiplier 36 if set to unity and that of 35 to zero, the circuit is equivalent to that of FIG. 1 at signal frequencies except that network 11 and resistor 16 are replaced by network 31 and resistor 32. It was shown for FIG. 1 that the hybrid balance impedance was:

$$Z_1 \frac{R_2}{R_1}$$

It follows that in the second case mentioned above the hybrid balance impedance is:

$$Z_{11} \frac{R_2}{R_{11}}$$

where
  $Z_{11}$ is the impedance of network 31, and
  $R_{11}$ is the resistance of resistor 32.

More complete analysis shows that, if the gains of multipliers 35, 36 are $M_1$, $M_{11}$ respectively, the hybrid balance impedance is:

$$R_2 \left( \frac{M_1 + M_{11}}{\frac{M_1 R_1}{Z_1} + \frac{M_{11} R_{11}}{Z_{11}}} \right)$$

If the sum $M_1 + M_{11}$ is held constant, as is readily achieved, then the hybrid balance impedance varies in a continuous manner between the limit values cited above as $M_1$ is reduced and $M_{11}$ increased. If the control signals are derived so as to be an appropriate function of the line length, then the hybrid balance impedance can be made to adapt to the line length, so as to sensibly improve the performance over that achieved with fixed hybrid balance.

From the foregoing description it will be understood that, apart from the input node 1, and the base of transistor 5, all the circuit nodes can be at low voltage. The voltages at nodes 100, 101, 111 can be held close to that of the reference voltage line 17, if the networks 10, 11, 31 are made to have a much higher resistance than their associated resistors 15, 16, 32. Networks 10, 11, 31 are realised with components external to the integrated circuit so that they may be selected for difference application. Therefore the only components which must be external solely due to voltage constraints are the transistors 5 and 6. With the exception of these two transistors and the networks mentioned, the whole circuit can be designed to operate at below 5V permitting the use of a high density technology.

A limitation of the circuit described above is that the voltage at the input node 1 cannot be allowed to fall at any time, during normal operation, below the voltage established on the reservoir capacitor at the supply line 103. Should this occur transistor 5 becomes saturated and the feedback loops cease to operate correctly. In fact a malfunction is possible wherein a transient signal may cause transistor 5 to saturate and cause the feedback loop via amplifier 14 and transistor 6 to enter a positive feedback mode and discharge tne reservoir capacitor. The circuit may therefore be equipped with means to inhibit operation in this mode. In some countries, however, the telephone specifications demand operation at relatively low line voltages such that, for negative excursions of the input signal, the voltage at node 1 may fall below the level desirable to power the circuit. The feedback loop comprising elements 14, 6, 5, 7, 8, 12 may therefore be modified, for example as shown in FIG. 3 to permit operations under such conditions.

Figure 3:
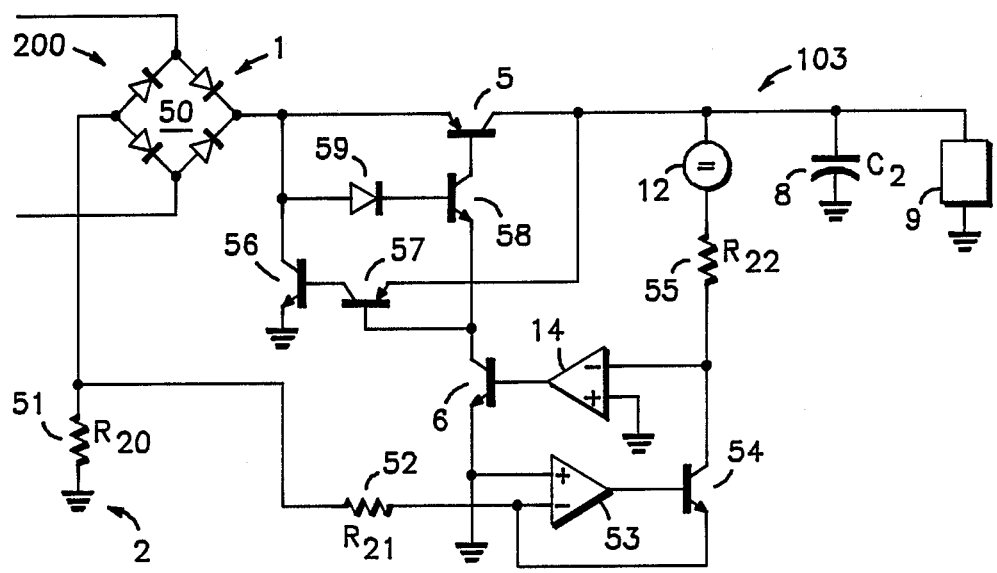
FIG. 3 is a block diagram of a different part of the circuit of FIG. 1, again incorporating some additional features.

FIG. 3 shows those parts of the embodiment of FIG. 1 which are modified: sections not shown are unchanged. For clarity a diode rectifier bridge 50, has been included. The negative output terminal 200, of the bridge is connected via a resistor 51 to the ground reference node 2 of the circuit and also via a resistor 52 to the inverting input of an operational amplifier 53 designed to accept input signals having quiescent values at the ground reference voltage and having its output coupled to the base of a transistor 54 which has its emitter coupled to the inverting input of the operational amplifier and it collector coupled to the inverting input of amplifier 14 and also via resistor 55 and offset voltage generator 12 to the regulated supply voltage line 103. It will be understood that, by this arrangement, a voltage V representative of the current flowing in the telephone line $I_L$ will be developed accross resistor 55, said voltage being given by:

$$V = I_L \frac{R_{20} R_{22}}{R_{20} + R_{21}}$$

where
$R_{20}$ is the resistance of resistor 51,
$R_{21}$ is the resistance of resistor 52, and
$R_{22}$ is the resistance of resistor 55. Resistors 52 and 55 are conveniently of much larger value than resistor 51 so that the quiescent current drawn from the supply line by transistor 54 is small. The voltage developed across resistor 55 in FIG. 3 provides the line current feedback signal which was developed across resistor 7 in FIG. 1.

In FIG. 3 the output of transistor 6 is coupled to the base of a pnp transistor 57 and the emitter of an npn transistor 58. The collector of transistor 57 is coupled to the base of an npn transistor 56, having its emitter coupled to the ground reference and its collector coupled to the input node 1. The emitter of transistor 57 is connected to the regulated supply line 103. The base of transistor 58 is coupled to the cathode of a diode 59 having its anode coupled to the input node 1. The collector of transistor 58 is coupled to the base of the pnp transistor 5 which has its emitter coupled also to node 1 and its collector coupled to the regulated supply line 103. In operation, if the voltage at node 1 is substantially higher than that on the supply line 103, then transistor 57 will be rendered non-conducting and a feedback loop comprising elements 14, 6, 58, 59, 5, 50, 51, 52, 53, 54, 55 will be established. If the voltage at node 1 falls to less than one diode voltage drop above that on the supply line 103 then transistor 58 will be rendered non-conducting and the path otherwise established via elements 6, 58, 59, 5 in said loop will be replaced by a path via elements 6, 57, 56, the line current passing essentially through transistor 56. Thus, when the line voltage suffices transistor 5 will be operational and current will be supplied to charge the reservoir capacitor 8 while, when the line voltage is insufficient, as on negative signal excursions, the line current flows through transistor 56 but, in either state, the line current flows through resistor 51 so that the line current feedback signal is not perturbed.

It will be understood that in this embodiment the elements 5, 6, 56, 57 must be able to withstand high voltages, should these be developed at node 1.

We claim:
1. A telephone circuit for use in a telephone handset, comprising:
   a signal node for receiving a signal voltage;
   a microphone signal input for receiving a microphone signal;
   an earphone amplifier having an input and an output;
   a first impedance coupled between said signal node and said input of said earphone amplifier;
   combining means for combining a microphone signal supplied to said microphone signal input with a voltage derived from said signal node such that the combined output signal is in antiphase with the signal voltage at said signal node, said combining means having a first input coupled to said microphone signal input, an output coupled to said input of said earphone amplifier and a second input, said combining means comprises a first operational amplifier;
   a second impedance means coupled between said signal node and said second input of said combining means; and
   comparing means having a first input coupled to said output of said combining means, a second input coupled to said signal node and an output coupled to said signal node for comparing the combined output signal with a voltage representative of the current flowing at said signal node to provide a voltage at said output that is used to control current flowing at said signal node.

2. A telephone circuit according to claim 1 wherein said comparing means comprises a second operation amplifier having a first input coupled to said output of said combining means and a second input coupled to said signal node via a voltage regulator which provides said voltage representative of current flowing at the signal node.

3. A telephone circuit according to claim 2 wherein said current flowing at the signal node is controlled by means of a negative feedback loop whereby said output voltage provided by said comparing means is coupled to the control electrode of a first high voltage transistor whose emitter is coupled to a ground reference potential and whose collector is coupled to the control electrode of a second high voltage transistor whose emitter is coupled to the signal node and whose collector is coupled via a voltage regulator back to said comparing means.

4. A telephone circuit according to claim 3 wherein said earphone amplifier comprises
   a first variable gain means coupled to the input of said earphone amplifier and being responsive to a first control signal for controlling the gain of said first variable gain means, the output of said first variable gain means providing an input signal to subsequent amplifying stages of the earphone amplifier.

5. A telephone circuit according to claim 4 wherein said earphone amplifier further comprises a second input coupled via a third impeance to said signal node and to the output of said combining means, and a second variable gain means coupled to said second input of said earphone amplifier and being responsive to a second control signal for controlling the gain of said second variable gain means, the output of said second variable gain means being coupled to the output of said first variable gain means and providing therewith an input signal to subsequent amplifying stages of the earphone amplifier.

6. A telephone circuit according to claim 5 wherein said first impedance provides a DC conduction path between said signal node and the first-mention input of said earphone amplifier, and said earphone amplifier provides a DC output representative of the DC conduction through said first impedance and having a known relationship with the quiescent voltage established at the signal mode and hence with the length of a line coupled to the signal node.

7. A telephone circuit according to claim 6 wherein said third impedance provides a DC conduction path between said signal node and said second input of said earphone amplifier and said earphone amplifer provides a DC output representative of the DC conduction through both the first and third impedances.

8. A telephone circuit according to claim 6 wherein said DC output is coupled to said first input of said comparing means so as to produce a desired relationship between the DC current absorbed at said signal node and the quiescent voltage obtained thereat.

9. A telephone circuit according to claim 8 wherein said DC output is adapted to control the gains of variable gain means provided in the paths of the microphone signal applied to the microphone signal input and of the earphone signal produced at said output of said earphone amplifier in such manner that the performance of a telephone system incorporating said telephone circuit may be compensated for variations in transmission losses resulting from variations in the telephone line length.

10. A telephone circuit according to claim 6 wherein said DC output is adapted to provide said first and second control signals, whereby the output of said earphone amplifier is dependent on the signal appearing at the first or second inputs of the earphone amplifier or on a weighted combination thereof so that the hybrid balance impedance presented by the circuit to the telephone line may be varied so as to compensate for variations in the telephone line length.

11. A telephone circuit for use in a telephone handset, comprising:
   a signal node for receiving a signal voltage;
   a microphone signal input for receiving a microphone signal;
   an earphone amplifer having an input and an output;
   a first impedance coupled between said signal node and said input of said earphone amplifier;
   combining means having a first input coupled to said microphone signal input, an output coupled to said input of said earphone amplifier and a second input;
   a second impedance means coupled between said signal node and said second input of said combining means; and
   comparing means having a first input coupled to said output of said combining means, a second input coupled to said signal node via a voltage regulator and an output for providing a voltage which is used to control current flowing at said signal node; wherein an output signal is provided at said output of said combining means which is in antiphase with the signal voltage at said signal node.

* * * * *